United States Patent [19]

Asai et al.

[11] 4,206,624
[45] Jun. 10, 1980

[54] SHIFTING DEVICE FOR CONTINUOUS MAGNETIC WEB

[75] Inventors: Koichi Asai; Tohsuke Kawada, both of Chiryu; Yoshiyuki Iwaki; Ryozo Kuroda, both of Himeji, all of Japan

[73] Assignee: Mitsubishi Denki Kabushiki Kaisha, Tokyo, Japan

[21] Appl. No.: 923,398

[22] Filed: Jul. 10, 1978

[30] Foreign Application Priority Data

Jul. 6, 1977 [JP] Japan ................................. 52-80837

[51] Int. Cl.² ...................... H02K 15/00; B21D 11/06
[52] U.S. Cl. ........................................ 72/131; 29/596; 29/605; 29/609; 72/142
[58] Field of Search ................... 29/596, 605, 609; 72/142, 129, 131; 140/92.2

[56] References Cited

U.S. PATENT DOCUMENTS

| 3,062,267 | 11/1962 | Hart et al. | 72/142 |
|---|---|---|---|
| 3,152,629 | 10/1964 | Rediger | 72/142 |
| 3,206,964 | 9/1965 | Hart et al. | 72/142 |
| 3,283,399 | 11/1966 | Hart et al. | 29/605 |
| 3,741,262 | 6/1973 | Bell et al. | 140/92.2 |
| 3,842,493 | 10/1974 | Ohuchi et al. | 29/596 |
| 4,116,033 | 9/1978 | Iwaki et al. | 72/142 |

Primary Examiner—Erwin M. Combs
Attorney, Agent, or Firm—Wenderoth, Lind & Ponack

[57] ABSTRACT

A magnetic strip is first driven around one end of a mandrel by a plurality of cam operated pins slidably extending through a rotary member and is then moved along a spiral guiding piece disposed around the mandrel until the strip passes through a cutter in its inoperative position. Then the strip enters a push plate slidably mounted on the mandrel and travels along a spiral path therein to be spirally wound around the mandrel. When a predetermined length of the strip passes through the cutter, the cutter cuts the strip and the push plate is moved along the mandrel to shift the wound strip to a carrier abutting against the mandrel for readiness for the next working operation.

7 Claims, 11 Drawing Figures

SHIFTING DEVICE FOR CONTINUOUS MAGNETIC WEB

BACKGROUND OF THE INVENTION

This invention relates to a shifting device for a continuous web formed of a magnetic material, and more particularly to a shifting device for shifting a magnetic strip during manufacture of a stator core for small-sized electric generators, for example, automobile generators.

It is generally well known that a stator core for a small-sized electric generator such as an automobile generator has been previously manufactured by stamping a plurality of magnetic sheets into annular discs, superposing the stamped discs on one another to a predetermined thickness and fixing the resulting stack into a unitary structure through welding or rivetting. However, to stamp the magnetic sheets into annular discs has resulted in both an extremely low coefficient of utilization and poor economy, because those portions stamped out to form the central opening and stamped out exteriorly of the annular discs of the magnetic sheets are not used for the stator core and are not usable for other purposes. Also, as each of the magnetic sheets is relatively thin, it has been difficult to automatically superpose the stamped annular magnetic discs on one another to predetermined thicknesses and automatically fix a stack of the superposed annular discs such as by welding.

Therefore, upon manufacturing the stator cores as above described, it is desirable to provide methods attempting achieve the effective utilization of all of the magnetic material and the automation of the core manufacturing operation. One of such manufacturing methods has been alreadily known. According to one such method, the longitudinal edges of magnetic strips are suitably notched and the notched magnetic strips are successively wound into spirals with the notches directed radially inwardly thereof while the strips are cut into predetermined lengths to form separate magnetic cores. Then the magnetic cores are successively compressed and welded into unitary structures to thereby automatically manufacture stator cores one after another.

Japanese patent publication No. 18,403/1964 discloses and claims a device for manufacturing stator cores according to the method as above described, but this device has been disadvantageous in that an increase in work efficiency can not be expected and the device itself becomes large-scaled.

Accordingly, it is an object of the present invention to provide a new and improved shifting device for use in successively winding a continuous web formed of a magnetic material into spirals around a rotary spindle, which device performs the operation of winding a predetermined length of the continuous web into a spiral around the rotary spindle so as to permit the predetermined length of the continuous web to be easily shifted axially of the rotary spindle, while shifting the predetermined length of the continuous web through a simple operation.

SUMMARY OF THE INVENTION

The present invention provides a device for shifting a continuous magnetic web, such device including, in combination, a rotary member for winding a continuous web formed of a magnetic material around a mandrel, a shifting member disposed to be movable axially of the rotary member and including a guide member for guiding the continuous web to the rotary member so as to be wound into a spiral around the mandrel, the shifting member accommodating therein the continuous web while the web is guided by the guide member, and means responsive to the accommodation of a predetermined length of the continuous web in the shifting member to move the shifting member axially of the rotary member, to thereby shift the predetermined length of the continuous web.

BRIEF DESCRIPTION OF THE DRAWINGS

The present invention will become more readily apparent from the following detailed description taken in conjunction with the accompanying drawings in which.

Throughout the Figures like reference numerals designate identical or corresponding components.

DESCRIPTION OF THE PREFERRED EMBODIMENTS

While the present invention is applicable to the winding of a variety of continuous webs into spirals the same is particularly suitable for winding a magnetic strip into a spiral to manufacture a stator core and therefore the invention will now be described in conjunction with a magnetic strip wound into a spiral.

Figure 1:
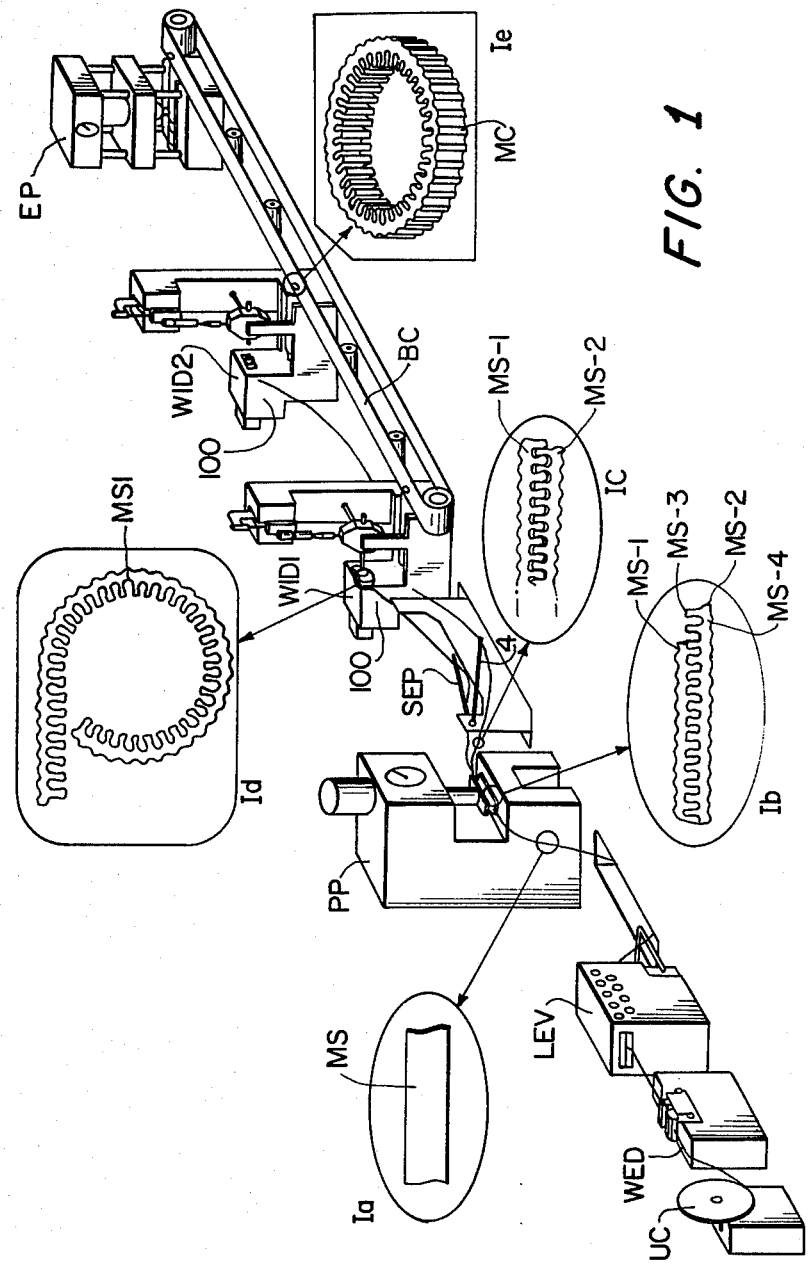
FIG. 1 is a schematic perspective view of an apparatus for successively manufacturing stator cores from a magnetic strip in accordance with the principles of the present invention with all manufacturing units illustrated in the order of the manufacturing steps, and with various different enlarged fragmental views of one portion of the magnetic strip worked at respective various points in the apparatus.

Referring now to FIG. 1 of the drawings, there is illustrated an apparatus for successively manufacturing stator cores of unitary structure for small-sized electric generators, for example automobile generators, from a magnetic strip. The arrangement illustrated shows all the manufacturing steps starting with the uncoiling of a roll of a magnetic strip and terminating at the completion of the stator core, and comprises an uncoiler UC carrying a roll of magnetic strip and a welder WED through which that portion of the magnetic strip MS drawn out from the uncoiler UC passes. The welder WED normally permits the magnetic strip to pass therethrough without any effect and is operative only to weld the tailing edge of a preceding magnetic strip drawn out from the uncoiler UC to a leading edge of a roll of magnetic strip newly mounted on the uncoiler UC to form a continuous strip. The magnetic strip MS leaving the welder WED enters a leveller LEV which corrects distortions caused on the strip as drawn out from the uncoiler UC to render the strip flat. The magnetic strip MS passes from the leveller LEV in a freely drooping state to a punch press PP.

In an elliptic block labelled Ia, there is illustrated, in an enlarged plan view, one portion of the magnetic strip MS before it enters the punch press PP.

As shown in an elliptic block labelled Ib, the magnetic strip MS passed through the punch press PP is longitudinally split into a pair of continuous strip portions MS-1 and MS-2, each including a series of teeth MS-3 disposed at substantially equal intervals thereon and meshing with a series of similar teeth MS-3 disposed on the other strip portion and a longitudinal edge portion MS-4 integrally supporting the associated teeth MS-3 and provided on the outer edge with a series of notches located also at substantially equal intervals for a purpose as will be apparent hereinafter. It will readily be understood that both series of teeth MS-3 are simultaneously punched in meshing relationship with both series of notches.

The split magnetic strip portions MS-1 and MS-2 are moved from the punch press PP toward a separator SEP including a pair of separating arms divergent in a V shape so that both strip portions pass over and contact free ends of the arms. Thus the teeth on each of the magnetic strip portions MS-1 or MS-2 on the outgoing side of the punch press PP are more or less separated from those on the other strip portion MS-2 or MS-1 as shown in an elliptic block labelled Ic and after having left the separating arms, both magnetic strip portions MS-1 and MS-2 are maintained fully separated from each other.

Subsequently the magnetic strip portions MS-1 and MS-2 thus separated enter a pair of first and second winders WID1 and WID2, respectively, tandemly disposed on an extention of the strip run. The first and second winders WID1 and WID2 are identical in both construction and operation. After having passed through a guide port 100 on each winder, the respective magnetic strip portion is successively wound into spirals with the teeth MS-3 radially inwardly directed as shown in a rounded rectangle labelled Id and cut into predetermined lengths to form half-finished magnetic cores one after another. Then the magnetic cores in the form of the thus formed stacked structure are successively compressed and welded into rigid structures resulting in stator cores such as shown by the reference characters MC in the rightmost block labelled Ie in FIG. 1. As shown, the stator core MC includes a radially inner periphery having slots alternating with poles formed of the teeth on each convolution of the magnetic strip portion axially aligned with those on adjacent convolutions thereof, and a radially outer periphery having therein notches disposed at substantially equal angular intervals. The notches are effective for intimately contacting each strip convolution with the adjacent strip convolutions.

The stator cores MC from each of the winders WID1 or WID2 are successively discharged to an endless belt type conveyor BC disposed to abut against one side, in this case the righthand side as viewed in FIG. 1, of winders WID1 and WID2 and are carried to a forming press EP. In the forming press EP, each of the stator cores is again compressed to increase the accuracy of its axial dimension, thereby resulting in the completion of the stator cores.

Figure 2:
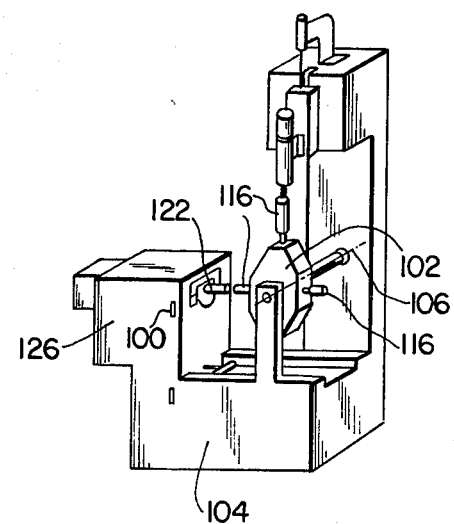
FIG. 2 is a perspective view, in a somewhat enlarged scale of the first winder shown in FIG. 1, with parts thereof omitted.

FIG. 2 shows, in a somewhat enlarged scale, the first winder WID1 illustrated in FIG. 1. In the arrangement illustrated a rotary member 102 is supported by a pair of opposite pedestals extending from a base 104, on the righthand side thereof as viewed in FIG. 2, and is intermittently rotated about the axis of rotation 106. A lefthand pedestal 126 as viewed in FIG. 2 on the base 104 is provided with a guide port 100 and has disposed therein a shifting device of the present invention shown as including a mandrel 122 extending toward one carrier 116 resiliently supported by the rotary member 102 to be movable radially of the axis of rotation 106.

Figure 3:
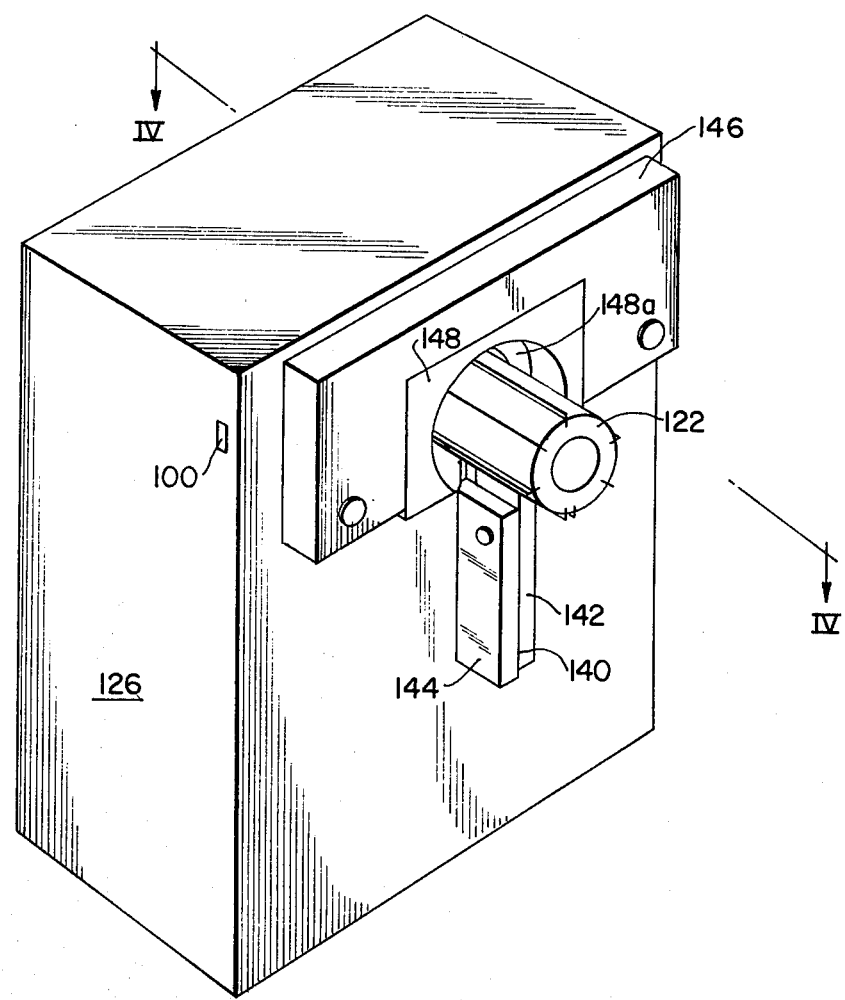
FIG. 3 is an enlarged perspective view of a shifting device constructed in accordance with the principles of the present invention.
Figure 4:
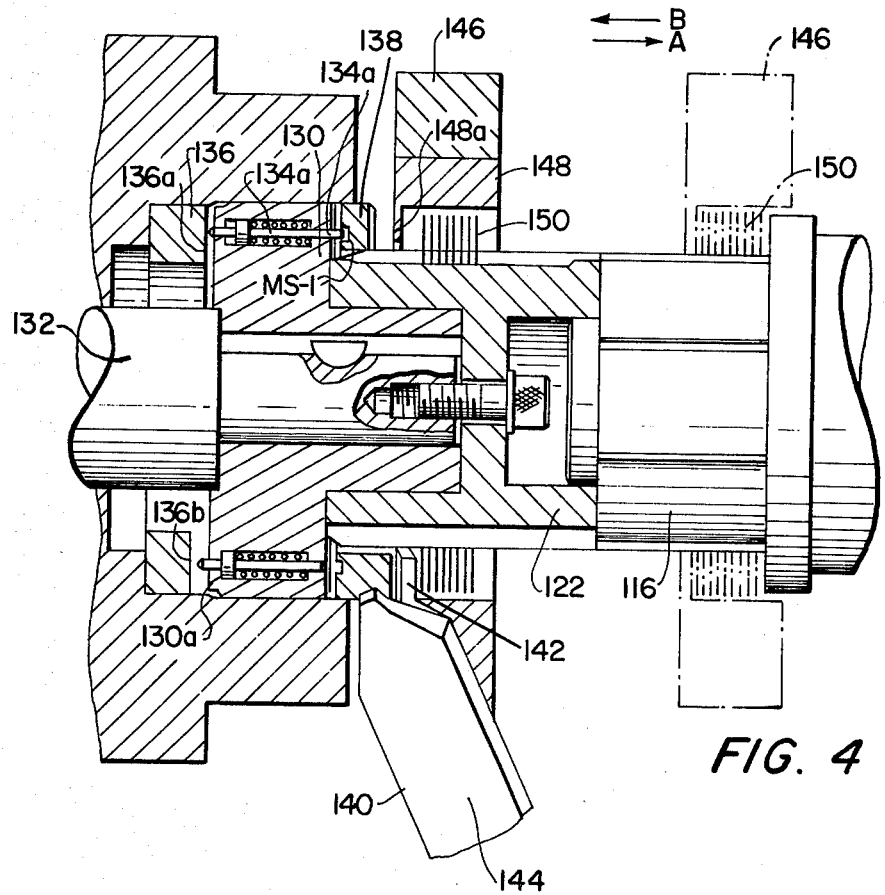
FIG. 4 is a longitudinal sectional view as taken along the line IV—IV of FIG. 3, with parts illustrated in elevation.

Referring now to FIGS. 3 and 4, there is illustrated one embodiment of the shifting device according to the present invention. The arrangement illustrated comprises the mandrel 122 having a first end portion projecting beyond the pedestal 126 (see FIG. 3), a hollow cylindrical rotary member 130 including a reduced diameter portion fitted into a second end portion of the mandrel 122, and a supporting rod 132 extending through the hollow rotary member 130 to be screwed to the second end portion of the mandrel 122. A plurality of operating pins 134a are coaxially extended at predetermined equal angular intervals through an outer peripheral portion 130a of the rotary member 130 which extends radially beyond the mandrel 122, although only two operating pins 134a are illustrated. Each of the operating pins 134a can axially move a predetermined distance and is normally maintained in a position where it does not project beyond a first radial surface of the outer peripheral portion 130a adjacent mandrel 122 by means of a spring as shown by the lower pin 134a in FIG. 4. An apertured cam disc 136 is fixedly disposed adjacent a second radial end surface of the rotary member 130 remote from the mandrel 122 to form a spacing therebetween. The cam disc 136 has an annular cam surface including one portion 136a close enough to the second end surface of the rotary member 130 remote from mandrel 122 to abut against the operating pins 134a to move the latter in the direction of the arrow A, to thereby cause pins 134a to protrude beyond the first radial surface of the outer peripheral portion 130a of the rotary member 130 adjacent mandrel 122 as shown by the upper pin 134a in FIG. 4, for a purpose as will be apparent later. The annular cam surface of cam disc 136 has a remaining portion spaced sufficiently from the second end surface of the rotary member 130 remote from mandrel 122 to be prevented from abutting against the operating pins 134a.

A guiding piece 138 in the form of a segment of a circle is fixedly disposed around the second end of the mandrel 122 to form an annular uniform space between guiding piece 138 and the outer peripheral portion 130a, which space is narrow enough to permit the magnetic strip portion MS-1 passed through the guide port 100

Figure 5:
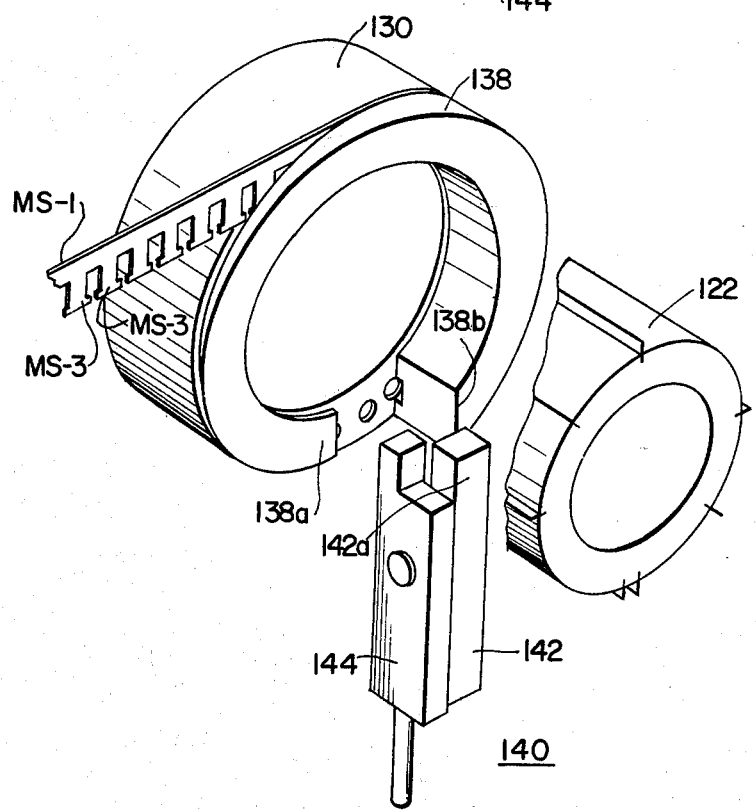
FIG. 5 is an exploded perspective view of one portion of the shifting device shown in FIGS. 3 and 4 and useful in explaining the manner in which a continuous web is wound into a spiral.

(see FIGS. 1 or 2) to be fitted therein. As best shown in FIG. 5, the annular guiding piece 138 gradually increases in thickness from a first end 138a thereof to a second end 138b thereof to guide therealong the strip portion MS-1 to be spirally wound around the mandrel 122.

As shown in FIG. 4, a cutter generally designated by the reference numeral 140 is disposed adjacent to the thicker end 138b of the guiding piece 138 to be located in a run of the magnetic strip MS-1 guided by the guiding piece 138. The cutter 140 is formed of a stationary and movable edges 142 and 144 arranged to pass therebetween the magnetic strip portion MS-1. Each time a predetermined length of the magnetic strip portion MS-1 passes through the cutter 140, the movable blade 144 is moved by any suitable means (not shown) to cut the magnetic strip portion.

Figure 6:
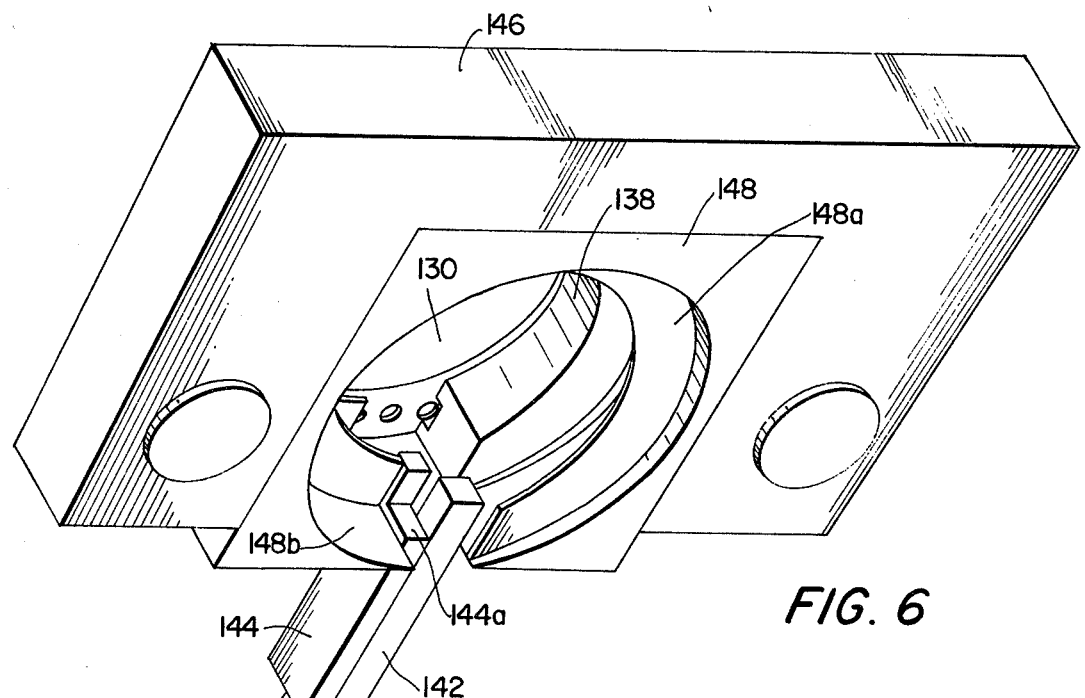
FIG. 6 is an enlarged perspective view of an essential part of the shifting device shown in FIGS. 3 and 4

Then a push plate 146 including a guide member 148 is slidably fitted onto the mandrel 122 to normally form a spiral space with the guiding piece 138 around the mandrel 122. As best shown in FIG. 6, the push plate 146 is rectangular and includes a central rectangular notch opening at the lower side thereof as viewed in FIG. 6. The guide member 148 is substantially square and rigidly fitted into the central notch on the push plate 146. The guide member 148 includes an arcuate hole extending therethrough and having a pair of opposite axial edges disposed adjacent to respective opposite ends of the guiding piece 138. The arcuate hole is provided on the inner peripheral surface thereof with a radially inwardly directed surface member 148a having a first end adjacent to the guiding piece 138 and extending spirally until it terminates at a second end remote from the guiding piece 138, as shown in FIG. 6. Thus the surface member 148a cooperates with the guiding piece 138 to form a spiral path for the magnetic strip portion around the mandrel 122 with the cutter 140 interposed between guiding piece 138 and surface member 148a.

In operation, the magnetic strip portion MS-1 passed through the guide port 100 (see FIG. 2) travels along the annular space formed between the rotary member 130 and the guiding piece 138 while the cam surface portion 136a successively abuts against the operating pins 134a cause them to protrude one after another beyond the rotating member 130 in the direction of the arrow A shown in FIG. 4. The protruded pins 134a are successively inserted into the gaps or slots formed between the teeth MS-3 of the magnetic strip portion MS-1 (see FIG. 3). Therefore, as the rotational member 130 is rotated, pins 134a cause the magnetic strip portion MS-1 to travel along the annular space around the mandrel 122 to initiate winding therearound with the teeth radially inwardly directed.

Upon the rotary member 130 effecting one half of one complete revolution after the cam surface portion 136a has abutted against a first one of the operating pins 134a, the rotary member 130 faces the other cam surface portion 136b to permit the first pin 134a to be returned back to its original position to disengage from the respective slot, while that portion of the magnetic strip guided by the first pin 134a appears at the thinner end 138a of the guiding piece 138. As the rotary member 130 is further rotated, that portion of the magnetic strip appearing at the thinner guiding end 138a travels along the spiral surface of the guiding member 138 until it reaches the thicker guiding end 138b.

The process as above described is repeated with the succeeding operating pins 134a so that the successive portions of the magnetic strip travel past the thicker guiding end 138b.

Thereafter the magnetic strip passes between the stationary and movable cutter blades 142 and 144, respectively, and then travels along the guide surface member 148a to be spirally wound around the mandrel 122 while being accommodated within the guide member 148 within the push plate 146 as shown in FIG. 4.

Upon a predetermined length of the magnetic strip portion MS-1 passing through the cutter 140, rotation of the rotary member 130 is suspended and the cutter 140 cuts the magnetic strip portion by moving the movable blade 144 toward the stationary blade 142.

In this way the predetermined length of the magnetic strip portion MS-1 has been spirally wound around the mandrel 122 and accommodated within the push plate 146 as shown by solid line portion and the reference numeral 150 in FIG. 4.

Then that carrier 116 (see FIG. 2) opposite to the mandrel 122 is caused to abut against mandrel 122 and the push plate 146 is moved in the direction of the arrow A shown in FIG. 4 to a position indicated by the dashed lines in FIG. 4, e.g. by cylinder and piston means (not shown), with the result that the spirally wound magnetic strip having the predetermined thickness is shifted to the carrier 116 as shown in FIG. 4. That is, a wound magnetic core 150 has been formed and shifted to the carrier 116.

Then the push plate 146 is moved in the direction of the arrow B shown in FIG. 4 to be returned back to its original position illustrated by the solid lines in FIG. 4. Following this, the rotary member 130 is again rotated while the process as above described is repeated to form wound magnetic cores one after another.

On the other hand, the carrier 116 bearing the wound magnetic core 150 is rotated in the clockwise direction as viewed in FIG. 2 through an angle of 90 degrees whereupon the wound magnetic core is compressed and welded, thus resulting in formation of a stator core. Thereafter the carrier 116 with the stator core is intermittently rotated through an angle of 180 degrees to reach a discharge channel. Then the stator core disengages from the carrier 116 to fall in the discharge channel and is shifted to the endless belt type conveyor BC (see FIG. 1).

In this way the wound magnetic cores successively formed by the arrangement shown in FIGS. 2 and 3 are shifted to the carriers 116 abutting against the mandrel 122 one after another and worked until they are shifted to the conveyor as above described.

As seen in FIG. 6, the cutter 140 is so positioned that the movable blade 144 includes a flat edge 144a substantially flush with the incoming end 148b of the guide member 148 in order to prevent the movable blade 144 from impeding the travel of the magnetic strip portion MS-1. Alternatively the flat edge 144a may be somewhat lower in level than the incoming end 148a of the guide member 148.

Similarly an edge perpendicular to flat edge 144a is substantially flush with or somewhat closer to the guiding piece 138 than the incoming end of the surface member 148a.

While the guide surface member 148a is shown in FIG. 6 as being spiral, the same may include at least one portion monotonously sloped and merged into the remaining portion rendered flat in a direction substantially perpendicular to the longitudinal axis of the mandrel 122, not shown in FIG. 6.

In the arrangement illustrated in FIG. 6 the guide member 148 is disposed within the push plate 146 so that the magnetic strip portion MS-1 is accommodated in the push plate 146 while it is guided by the guide member 148. Therefore it is easy to wind the magnetic strip portion into a spiral and shift the spirally wound magnetic strip portion having a predetermined length to an associated component such as the carrier.

Figure 7:
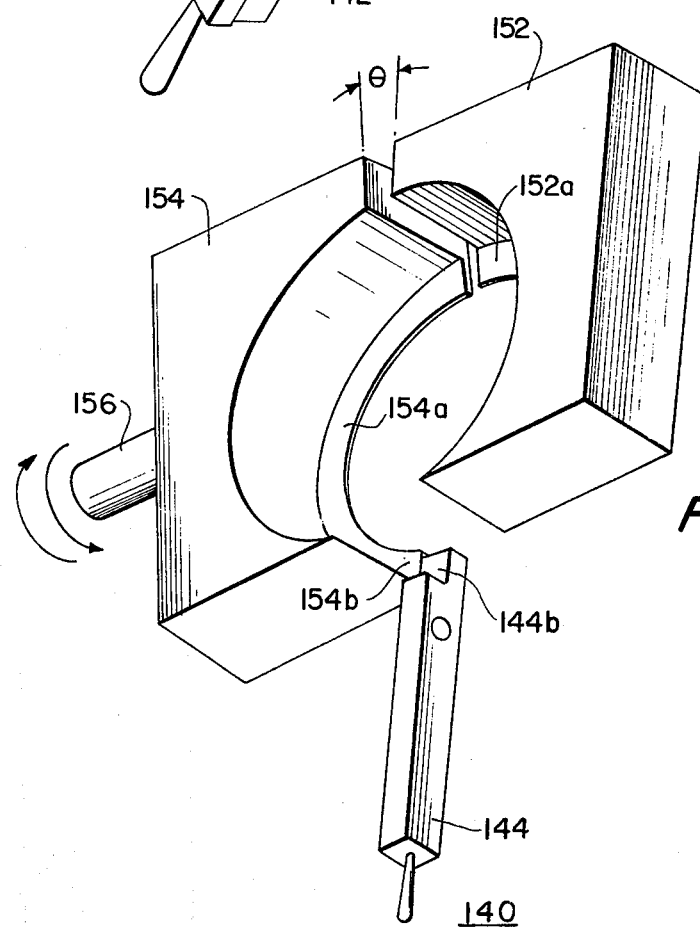
FIG. 7 is an enlarged perspective view of a modification of the guide member shown in FIG. 6 and illustrated in one of its operating positions.

FIG. 7 shows a modification of the guide member 148 illustrated in FIG. 6. In the arrangement illustrated in FIG. 7 the guide member is divided into a stationary guide portion 152 and a movable guide portion 154 such division being along a diameter of the hole passing midway between both ends of the guide surface member 148a shown in FIG. 6. The movable guide portion 154 is rotatable about the axis of a rotatable rod 156 connected thereto and in either of opposite directions within limits. The stationary and movable guide portions 152 and 154 respectively include radially inwardly directed surface members 152a and 154a.

Figure 8:
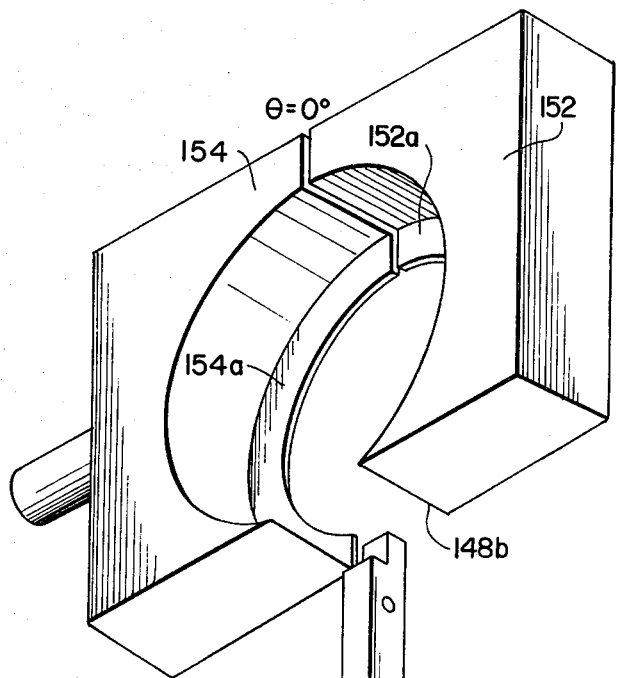
FIG. 8 is a view similar to FIG. 7 but illustrating the modified guide member shown in FIG. 7 in another operating position thereof.

The movable guide portion 154 is shown in FIG. 7 as being rotated through an angle of rotation $\theta$ relative to the stationary guide portion 152 and in FIG. 8 as having the angle of rotation equal to zero. That is, both guide portions are flush with each other. As seen in FIG. 8, both guide surface portions 152a and 154a having a null angle of rotation therebetween are arranged to form together an annular flat guide member that is in a plane substantially perpendicular to the longitudinal axis of the mandrel 122 (not shown in FIG. 7).

However with the movable guide portion 154 rotated through an angle $\theta$ relative to the stationary guide portion 152 about the longitudinal axis of the rotatable rod 156, the guide surface members 152a and 154a form together a substantially spiral guide member as shown in FIG. 7 but not the annular flat member such as shown in FIG. 8. That is, by rotating the movable guide portion 154 through a predetermined angle $\theta$ relative to the stationary guide portion 152, a spiral guide surface member can be easily formed. Under these circumstances, the movable blade 144 includes a vertical edge 144b substantially flush with the incoming end 154b of the guide surface member 154a as shown in FIG. 7.

From the foregoing it is seen that the arrangement shown in FIGS. 7 and 8 can readily form either an annular flat guide surface or a spiral guide surface by rotating the movable guide portion 154 through a predetermined angle relative to the stationary guide portion 152.

Figure 9:
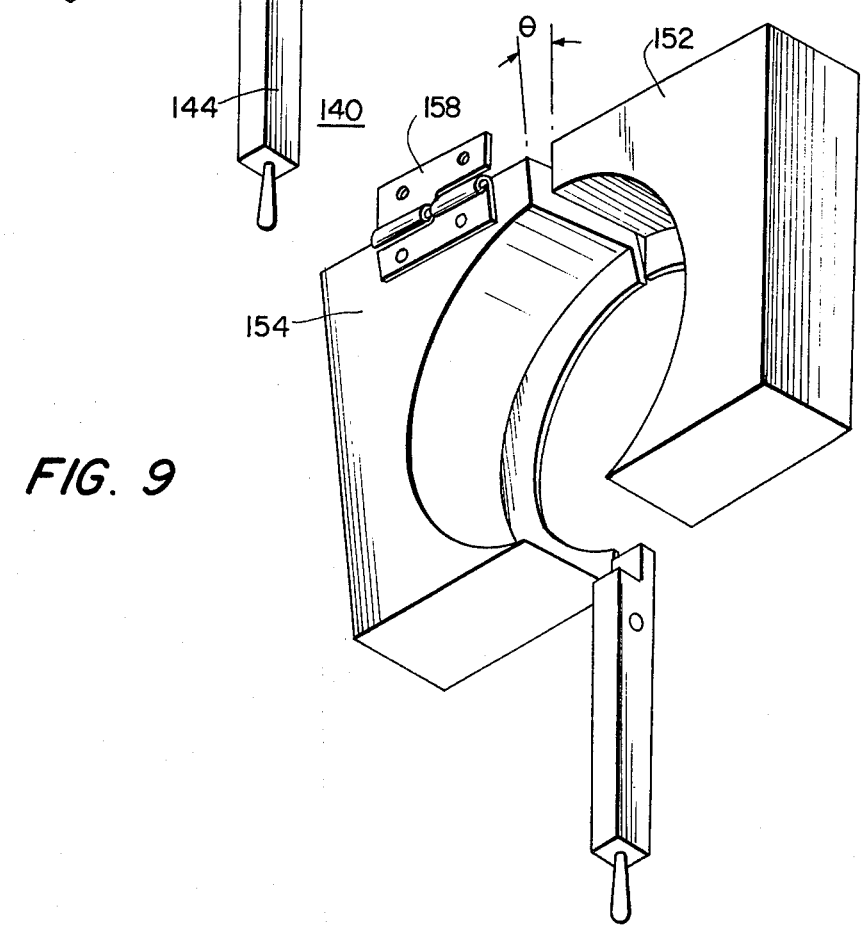
FIGS. 9 is a view similar to FIG. 7 but illustrating a modification of the arrangement shown in FIGS. 7 and 8.

The arrangement illustrated in FIG. 9 is different from that shown in FIGS. 7 and 8 only in that in FIG. 9 a hinge 158 is substituted for the rotatable rod 156 shown in FIGS. 7 and 8.

In both the arrangements shown in FIGS. 7 and 8 and in FIG. 9, the movable guide portion 154 is first rotated through the angle $\theta$ relative to the stationary guide portion 152 and then the magnetic strip MS-1 (not shown in FIGS. 7, 8 and 9) is spirally guided by both guide portions 152 and 154. After the predetermined length of the magnetic strip portion has been wound into a spiral to form a wound magnetic core 150 (see FIG. 4) the movable guide portion 154 is returned back to its original state in which the angle $\theta$ is null to form, along with the stationary guide portion 152, the annular flat surface member substantially perpendicular to the longitudinal axis of the mandrel 122 (see FIG. 8). Then, upon moving the guide member formed of the components 152 and 154 axially of the rotary member 130 (see FIG. 4), the predetermined length of the magnetic strip portion in a single body is similarly shifted by means of the flat guide member. This shifting of the magnetic strip portion having the predetermined length is smoothly accomplished because the guide surface member is flat and substantially perpendicular to the longitudinal axis of the rotary member 130 (see FIG. 4).

Figure 10:
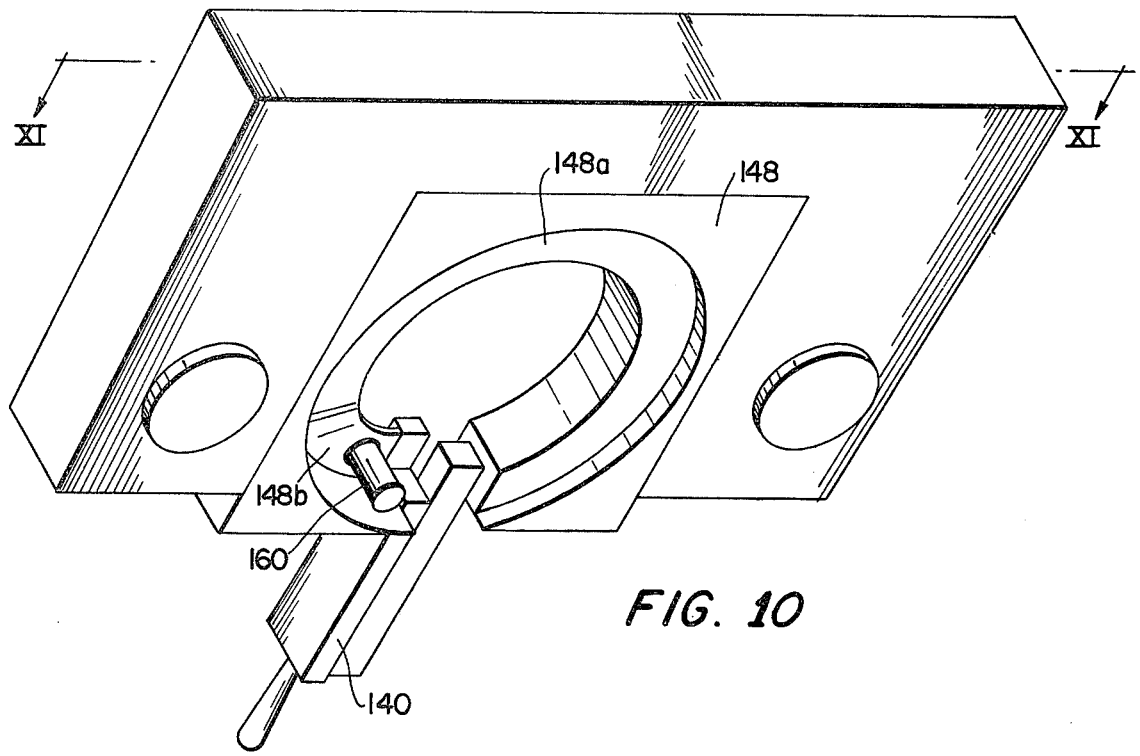
FIG. 10 is a view similar to FIG. 6 but illustrating a modification of the guide member shown therein.
Figure 11:
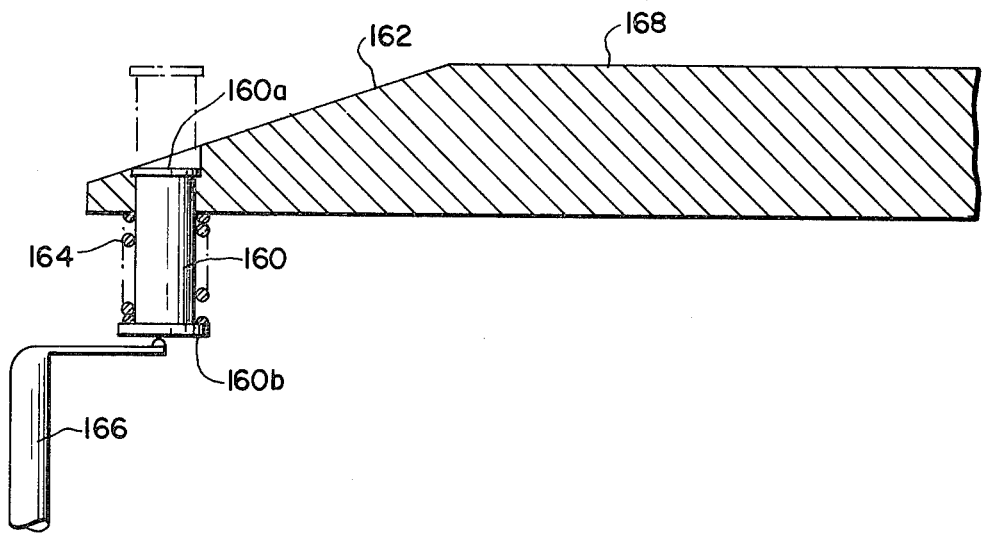
FIG. 11 is a sectional view as taken along the line XI—XI of FIG. 10 and useful in explaining the operation of the guide member shown in FIG. 10.

FIG. 10 shows another modification of the guide member 148 illustrated in FIG. 6. In the arrangement illustrated in FIG. 10 a protrusible pin 160 is disposed on the annular guide surface member 148a adjacent to the incoming end 148b through which the magnetic strip portion (not shown) passes through the cutter 140 and travels along the surface member 148a. As shown by solid lines in FIG. 11, the protrusible pin 160 is normally maintained in a retracted position where its upper face 160a does not protrude beyond a sloped surface portion 162 of the guide surface member 148a by the action of a helical spring 164 disposed between the lower surface of the guide surface member 148a and a lower pin face 160b around the pin 160.

After a predetermined length of the magnetic strip portion (not shown) has been wound in a spiral as above described and cut off from the remaining portion thereof by the cutter 140, fluid operated cylinder and piston means, for example, is operated to move the pin 160 by a rod 166 connected to the pin 160 and against the action of the spring 164. Such cylinder and piston means is not illustrated only for purposes of clarity of illustration. Therefore the pin 160 protrudes beyond the sloped surface portion 162 of the guide surface member 148a until its upper face 160a is substantially flush with a flat surface portion 168 of the surface member 148a parallel to the lower surface thereof or perpendicular to the longitudinal axis of the mandrel 122 (see FIG. 4). FIG. 10 shows the pin 160 in its protruding position that is also shown in broken lines in FIG. 11. The pin 160 in its protruding position serves to put each convolution of the wound magnetic strip substantially in a plane perpendicular to the longitudinal axis of the mandrel. Therefore the resulting magnetic core can be easily shifted to the associated carrier.

From the foregoing it is seen that the present invention provides a shifting device comprising a guide member for guiding a continuous web formed of a magnetic material so as to be wound in a spiral around a mandrel, a shifting member movable axially of the mandrel for accommodating therein the continuous web while the web is guided by the guide member, and means responsive to the accommodation of a predetermined length of the continuous web within the shifting member to move the shifting member axially of the mandrel, to thereby shift the continuous web having the predetermined length. Therefore as the shifting member itself accommodates directly a predetermined length of the continuous web therein followed by the movement thereof, the continuous web having the predetermined length can readily be shifted thus resulting in an increase in working efficiency.

While the present invention has been illustrated and described in conjunction with certain preferred embodiments thereof, it is to be understood that numerous changes and modifications may be resorted to without departing from the spirit and scope of the present invention. For example, the guide surface member may be formed of a leaf spring and disposed to be maintained spiral upon winding the magnetic strip portion around the mandrel and to be capable of being fixed in a plane perpendicularly to the longitudinal axis of the mandrel. Also the movable blade of the cutter may be operatively associated with the incoming end of the guide member disposed in the push plate, while the stationary blade of the cutter may be omitted.

We claim:

1. A device for winding a continuous magnetic web into a spiral and for then axially shifting the thus wound spiral, said device comprising:

a rotary spindle having axially opposite first and second ends;

means for feeding a continuous magnetic web onto said spindle at a position adjacent said first end thereof, and for, upon rotation of said spindle, forming said web into a spiral which accumulates spirally circumferentially around said spindle and in a direction toward said second end thereof;

a shifting member positioned to be axially movable of said spindle between a first position adjacent said first end of said spindle and a second position outwardly of said second end of said spindle;

said shifting member including guiding member means for, when said shifting member is in said first position thereof, guiding said spiral during the accumulation thereof around said spindle, and for, after the accumulation of a predetermined length of said web in the form of said spiral around said spindle, shifting said spiral axially of said spindle during movement of said shifting member from said first position thereof toward said second position thereof;

said guiding member means including means for contacting an axial end of said spiral which faces toward said first end of said rotary spindle; and means for moving said contacting means from a first position maintaining said spiral inclined with respect to the axis of said rotaty spindle, when said shifting member is in said first position thereof, and a second position maintaining said spiral substantially perpendicular to said axis of said rotary spindle, when said shifting member moves from said first position thereof toward said second position thereof.

2. A device as claimed in claim 1, wherein said guiding member means comprises two separate portions divided along a direction extending diametrically of said rotary spindle, said two portions having respective surfaces forming said contacting means, and said moving means comprises means for mounting at least a first of said portions for tilting movement between a first position whereat said surface of said first portion extends in a plane inclined to the axis of said rotary spindle, when said shifting member is in said first position thereof, and a second position whereat said surface of said first portion extends in a plane perpendicular to said axis of said rotary spindle, when said shifting member moves from said first position thereof toward said second position thereof.

3. A device as claimed in claim 2, wherein said tilting movement means comprises a rotatable rod connected to said first portion.

4. A device as claimed in claim 2, wherein said tilting movement mounting means comprises a hinge connected to said first portion.

5. A device as claimed in claim 1, wherein said guiding member means comprises a stationary spiral-shaped plate having first and second end portions positioned in respective first and second planes which extend perpendicular to said axis of said rotary spindle and which are axially spaced from each other, and said moving means comprises a pin axially movably positioned within said first end portion and movable from a retracted first position within said first end portion to a protruded second position extending from said first end portion to said second plane.

6. A device as claimed in claim 1, further comprising cutter means, located at a position in the path along which said web moves during forming of said web into said spiral, for cutting said web upon the completion of said accumulation of said predetermined length of said web.

7. A device as claimed in claim 6, wherein said cutter means comprises a stationary blade and a movable blade located at a position such that said continuous web passes therebetween.

* * * * *